United States Patent

[11] 3,599,556

| [72] | Inventor | Ditlev P. Madsen |
| | | Palos Park, Ill. |
| [21] | Appl. No. | 6,802 |
| [22] | Filed | Jan. 29, 1970 |
| [45] | Patented | Aug. 17, 1971 |
| [73] | Assignee | Chemetron Corporation |
| | | Chicago, Ill. |

[54] VACUUMIZING APPARATUS
10 Claims, 2 Drawing Figs.

[52] U.S. Cl. .................................................. 99/272
[51] Int. Cl. ............................................. B65b 31/00
[50] Field of Search .................................... 99/272, 273, 270, 269, 271, 234, 107, 157, 187

[56] References Cited
UNITED STATES PATENTS

| 2,425,912 | 8/1947 | Appel | 99/272 |
| 3,105,433 | 10/1963 | Yerex | 99/272 |
| 3,314,383 | 4/1967 | Schlernitzauer | 99/272 |
| 3,464,343 | 9/1969 | Wedekind | 99/272 |
| 3,529,532 | 9/1970 | Reznik | 99/272 |

*Primary Examiner*—Robert W. Jenkins
*Attorney*—Nicholas M. Esser

ABSTRACT: In vacuumizing apparatus for removing air from meat emulsions and like food products, an improved pump is provided to substantially reduce problems of surging and smearing of food products. The improved pump comprises actuating means for actuating control means to cause the piston of the pump to assume a predetermined adjusted rest position and improved checking return flow of food products to the pump chambers.

PATENTED AUG 17 1971
3,599,556
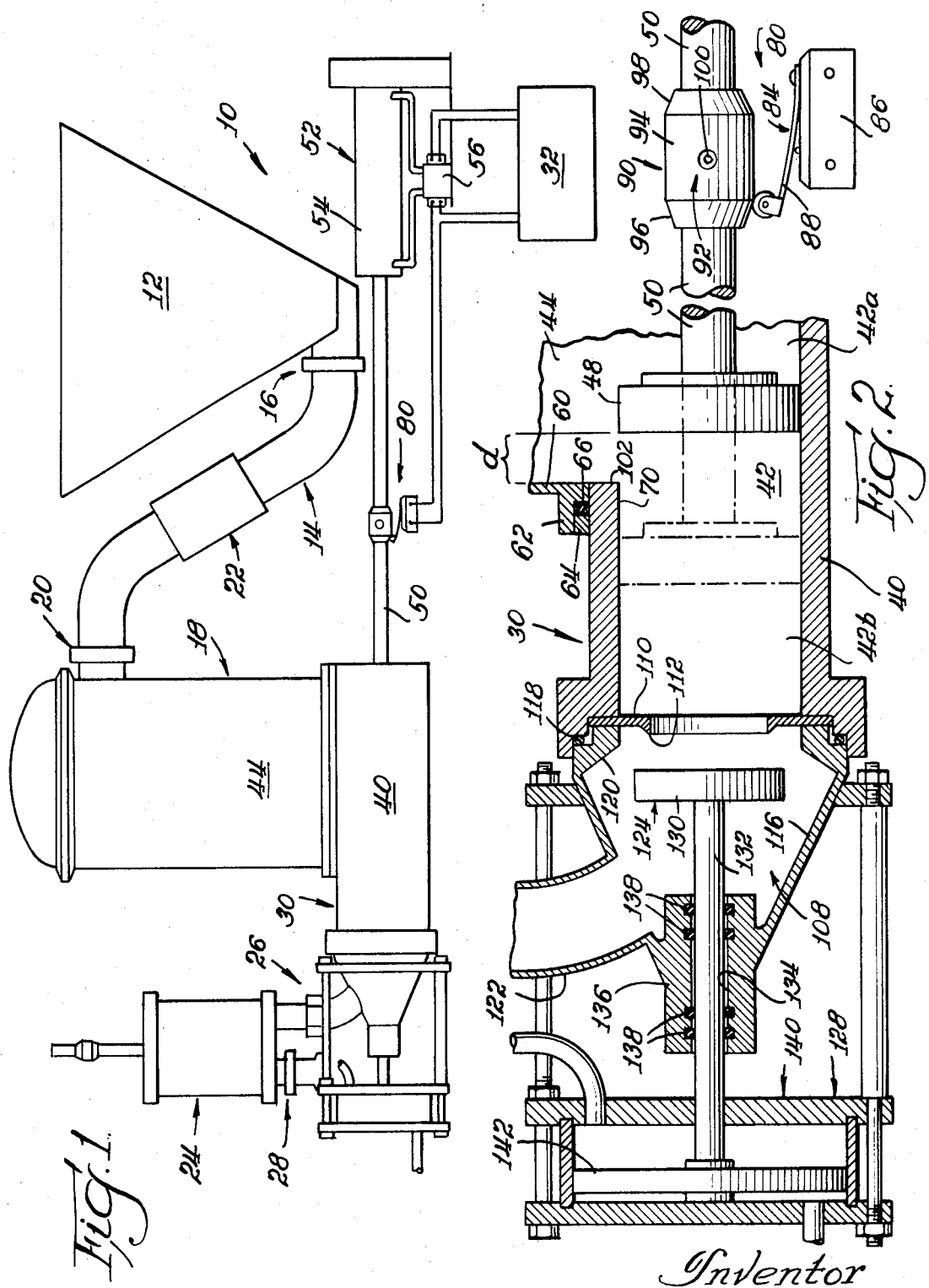
Inventor
Ditlev P. Madsen
By _____ Att'y

VACUUMIZING APPARATUS

BACKGROUND OF THE INVENTION

This invention pertains to vacuumizing apparatus for removing air from meat emulsions and like food products.

Removal of air from meat emulsions and like food products reduces oxidation and thus minimizes spoilage loss and enhances the appearance of the finished food product. Furthermore, it permits the finished food product to have generally consistent uniform density, when stuffed into flexible casings or canned, and thus promotes slicing of the finished food product and tends to keep the slices from falling apart. Likewise, it reduces product expansion during cooking and minimizes breakage and distortion of flexible casings.

In conventional vacuumizing apparatus, in which air is removed from a meat emulsion or like food product by application of vacuum pressure in a vacuum chamber, the foregoing advantages of air removal may be offset by at least two problems generally attributable to the manner in which the food product is handled. A first such problem is that of surging. This problem is generally attributable to the intermittent action of the pump used to pump the food product from the vacuum chamber. Surging tends to cause the food product momentarily to lose its uniform density, when stuffed into flexible casings or canned, and tends to cause breakage and distortion of flexible casings. A second such problem is that of smearing. This problem is generally attributable to the resistance to flow of the food product through the pump. Smearing is characterized by a breaking down of the fibers of the food product and tends to cause the food product to assume a greasy or creamy texture.

This invention is addressed to improvements in vacuumizing apparatus, as described, whereby the aforementioned problems of surging and smearing are substantially reduced.

SUMMARY OF THE INVENTION

It is the principal object of this invention to provide improvements in vacuumizing apparatus for removing air from meat emulsions and like food products by application of vacuum pressure in a vacuum chamber.

It is a more particular object of this invention to provide vacuumizing apparatus of the foregoing type having an improved pump to substantially reduce problems of surging and smearing of the food product.

The preceding objects may be attained in vacuumizing apparatus of the type wherein control means are provided for controlling the operation of the pump used to pump the food product from the vacuum chamber, and wherein the pump comprises a housing, which defines a generally cylindrical pump chamber opening into a lower portion of the vacuum chamber, a piston, which is reciprocable within the pump chamber, a piston rod, which is connected between the piston and a prime mover to reciprocate the piston to pump product from the lower portion of the vacuum chamber outwardly through the pump chamber. In accordance with the principles of this invention, the pump further comprises actuating means for actuating the control means, upon movement of the piston rod to a predetermined adjusted position, to cause the piston to assume a predetermined adjusted rest position relative to the pump chamber, and improved checking means for permitting discharge of product from the pump chamber and checking flow of product back into the pump chamber.

Preferably, the actuating means comprises a switch having an externally actuatable switching element supported in spaced relation to the piston rod, an actuating element in the form of a generally cylindrical collar having bevelled leading and trailing surfaces and being slidable along the piston rod, and means for securing the collar to the piston rod at a predetermined position for actuation of the switching element upon movement of the collar across the switching element.

Preferably, a valve seat is disposed outwardly of the piston, and the checking means comprises a valve member on the opposite side of the valve seat from the piston in combination with means responsive to actuation of the control means by the actuating means for moving the valve member away from the valve seat upon advance movement of the piston from the rest position and for moving the valve member toward the valve seat upon return movement of the piston.

These and other objects, features, and advantages of this invention are evident from the following description, with the aid of the attached drawing, of a preferred embodiment of this invention.

BRIEF DESCRIPTION OF THE DRAWING

In the drawing:

FIG. 1 is a partly diagrammatic elevational view of vacuumizing apparatus embodying the principles of this invention in an improved pump; and FIG. 2 is a partly broken away longitudinal section view of the pump shown in FIG. 1.

DESCRIPTION OF A PREFERRED EMBODIMENT

The vacuumizing apparatus indicated generally at 10 in the drawing constitutes a preferred embodiment of this invention. As shown, it generally comprises a hopper 12, which is arranged to receive meat emulsion on like food product from a conventional mixer or blender (not shown), an enlarged generally tubular conduit 14, which opens into a lower outlet fitting 16 of the hopper 12, and a vacuum chamber 18, which is suitably connected to a vacuum source (not shown). Vacuum pressure applied to the vacuum chamber 18 serves both to draw the food product from the hopper 12 through the conduit 14 into an upper inlet fitting 20 of the vacuum chamber 18 and to remove air from the food product in the vacuum chamber 18. A metering valve, which is indicated generally at 22, is used to meter flow of the food product through the conduit 14.

As shown, an accumulator 24 is arranged to accumulate food product at an inlet fitting 26 and to discharge the food product at an outlet fitting 28, either continuously or on demand, for further processing by means of conventional apparatus (not shown) either for canning the food product or stuffing the food product into molds or flexible casings. The vacuumizing apparatus 10 further generally comprises a pump 30, which is arranged to pump the food product from the vacuum chamber 18 to the accumulator 24, and control means, which is indicated diagrammatically at 32, for controlling the operation of the pump 30.

The pump 30 comprises a housing 40, which defines a generally cylindrical pump chamber 42 opening into a lower portion 44 of the vacuum chamber 18. The pump chamber 42 has a portion 42a disposed beneath the vacuum chamber 18 and a portion 42b extended outwardly from the vacuum chamber 18. The pump 30 further comprises a piston 48, which is reciprocable within the pump chamber 42, and a piston rod 50, which is connected between the piston 48 and a prime mover 52 to reciprocate the piston 48. Thus, the pump 30 is adapted to pump the food product from the lower portion 44 of the vacuum chamber 18 outwardly through the pump chamber 42. As shown, the prime mover 52 is in the form of conventional fluid-driven piston-cylinder mechanism 54 arranged to extend and retract the piston rod 50. Conventional valve mechanism 56, which is responsive to the control means 32, is arranged to direct driving fluid to opposite sides of the piston (not shown) of the piston-cylinder mechanism 54 for controlled extension and retraction of the piston rod 50.

As indicated in FIG. 2, the lateral wall 60 of the vacuum chamber 18 has a flange 62, which is adapted to be bolted or otherwise suitably attached to a flange 64 on the housing 40. A compressible sealing ring 66 is pressed against the flange 62 in a slot in the flange 64 to seal the vacuum chamber 18. The flanges 62 and 64 define an enlarged opening 70 between the lower portion 44 of the vacuum chamber 18 and the portion 42a of the pump chamber 42. Thus, the food product drops from the vacuum chamber 18 into the pump chamber 42.

The structures described in the preceding paragraphs are conventional in previously known vacuumizing apparatus and represent an exemplary setting for application of the principles of this invention. Further details of such structures may be supplied readily by those skilled in the art.

Previously known vacuumizing apparatus have been provided with control means, similar to the control means 32, for controlling the operation of the pump. An important function of such control means is to actuate valve mechanism to cause the piston of the pump to assume a predetermined rest position before each advancing stroke. Conventionally, a switch responsive to movement of the piston of the pump to a predetermined fixed position has been used to actuate the control means to initiate such function. It has been observed that the problem of surging of food products is greatest at the beginning of each advancing stroke of the piston of the pump from the rest position. The vacuumizing apparatus 10 is improved to substantially reduce the surging problem in that it further comprises novel actuating means 80 to take the place of such switch. The novel actuating means 80 actuates the control means 32, upon movement of the piston rod 50 to a predetermined adjustable position, to cause the piston 48 to assume a predetermined adjustable rest position before each advancing stroke.

The actuating means 80 comprises a normally opened switch 84, which has a fixedly mounted base 86 and an actuatable switching element 88 supported by the base 86 in spaced relation to the piston rod 50, an actuating element 90, which is slidable along the piston rod 50, and means 92 for securing the actuating element 90 to the piston rod 50 at a predetermined position to permit actuation of the switching element 88 to close the switch 84 upon movement of the actuating element 90 across the switching element 88. As shown, the actuating element 90 is in the form of a collar 94 having bevelled leading and trailing surfaces, 96 and 98 respectively, and the means 92 for securing the collar 94 is in the form of a suitably recessed setscrew 100.

In accordance with the principles of this invention, the rest position of the piston 48 may be adjusted, by adjustment of the position of the collar 94 along the piston rod 50, as aforementioned, to provide a predetermined adjusted displacement between the piston 48 and the margin 102 of the opening 70 between the lower portion 44 of the vacuum chamber 18 and the pump chamber 42. In FIG. 2, in which the piston 48 is shown in the rest position in full lines and in an advanced position in dashed lines, such displacement is indicated at $d$. Normally, before each advancing stroke of the piston 48 from the rest position, a quantity of the food product is disposed within the pump chamber 42 ahead of the piston 48. At the beginning of each advancing stroke of the piston 48 from the rest position, a portion thereof is expressed between the piston 48 and the margin of the opening 70, while the remaining portion begins to be moved through the pump chamber 42 by the advancing piston 48.

With pump constructions of the prior art, surging of the food product within the pump chamber tends to be greatest at the beginning of each advancing stroke of the piston from the rest position. In contrast, with the pump construction of this invention, surging of the food product within the pump chamber 42 is substantially reduced by expression of a portion of the food product disposed within the pump chamber 42 ahead of the piston 48, as aforementioned, at the beginning of each advancing stroke of the piston 48 from the rest position. The displacement $d$ should be readjusted for each particular type of food product being handled. The average viscosity of the food constitutes an applicable guideline. Thus, whereas the displacement $d$ should be increased for a more viscous food product to minimize the flow restriction, the displacement $d$ should be decreased for a less viscous food product to maximize the pump efficiency.

Previously known vacuumizing apparatus have been provided with means for checking return flow of food product to the pump chamber. Conventionally, normally closed check valve means having a spring-biased valve member is located at the outlet end of the pump chamber. It has been observed that the resistance to flow offered by such a valve substantially increases the problem of smearing of a food product as the food product is pumped through the pump chamber past the spring-biased valve member of such valve means. The vacuumizing apparatus 10 is further improved to substantially reduce surging and smearing in that it further comprises improved checking means 108 to take place of such normally closed check valve means. The improved checking means 108 permits discharge of the food product from the pump chamber 42 and checks return flow of the food product to the pump chamber 42.

A generally annular plate 110, which forms a valve seat 112 as part of the checking means 108, is recessed in a flanged edge portion 114 of the housing 40 outwardly of the piston 48. A generally bell-shaped outlet fitting 116 is bolted or otherwise suitably mounted to the flanged edge portion 114 of the housing 40. A compressible sealing ring 118 is disposed between the fitting 116 and the flanged edge portion 114 of the housing 40. A flanged rim 120 on the fitting 116 holds the annular plate 110 in place. The fitting 116 is connected to the inlet fitting 26 of the accumulator 24 at an integral conduit portion 122.

In addition to the valve seat 112, the checking means 108 comprises a valve member 124 on the opposite side of the valve seat 112 from the piston 48 in combination with means 128 for moving the valve member 124 away from the valve seat 112 upon advance movement of the piston 48 from the rest position toward the valve seat 112 and for moving the valve member 124 toward the valve seat 112 upon return movement of the piston 48 to the rest position. As shown, the valve member 124 is in the form of a piston 130 carried on a piston rod 132 for movement within the outlet fitting 116. The piston rod 132 is slidable within a bore 134 through a generally cylindrical portion 136 of the outlet fitting 116. Suitable bearings 138 are used to reduce friction at the piston rod 132. As shown, the moving means 128 comprises conventional fluid-driven piston-cylinder mechanism 140 arranged to extend and retract the piston rod 132. The piston-cylinder mechanism 140 is connected in known manner to conventional valve mechanism (not shown) similar to the aforementioned valve mechanism 56 arranged to direct driving fluid to opposite sides of the piston 142 of the piston cylinder mechanism 140 for controlled extension and retraction of the piston rod 132. Preferably, such valve mechanism is responsive to the control means 32 for actuation in response to actuation of the switch 84, as aforementioned, to cause retraction of the piston rod 132 upon advance movement of the piston 48 from the rest position toward the valve seat 112 and to cause extension of the piston rod 132 upon return movement of the piston 48 to the rest position. Thus, the valve member 124 offers minimal resistance to flow and substantially reduces surging and smearing of the food product. Also, the piston-cylinder mechanism 140 of the moving means 128 may be adjusted to control the back and return pressures on the piston 142 and the speed and timing of the valve member 124 to further minimize surging and smearing of the food product.

Thus, it will be appreciated that all of the recited objects, advantages and features of this invention have been demonstrated as obtainable in a highly practical apparatus and one that is simple and positive in operation. It will be further understood that, although this invention has been described with respect to certain specific embodiments thereof, this invention is not limited thereto, since various modifications of said invention will suggest themselves from the aforesaid description and are intended to be encompassed within the scope of the appended claims.

I claim:

1. In vacuumizing apparatus of the type including a vacuum chamber adapted to remove air from a meat emulsion or like food product, a pump adapted to pump product from the vacuum chamber, and control means for controlling the operation of said pump, the improvement wherein said pump comprises a housing, which defines a generally cylindrical pump chamber opening into a lower portion of said vacuum chamber, a piston, which is reciprocable within said pump chamber, a piston rod, which is connected between said piston and a prime mover to reciprocate said piston thus to the pump product from the lower portion of said vacuum chamber outwardly through said pump chamber, and actuating means for actuating said control means, upon movement of said piston rod to a predetermined adjustable position, to cause said piston to assume a predetermined adjustable rest position.

2. The improvement of claim 1 wherein said actuating means comprises a switch having an externally actuatable switching element supported in spaced relation to said piston rod, an actuating element slidable along said piston rod, and means for securing said actuating element to said piston rod at a predetermined position to permit actuation of said switching element upon movement of said actuating element across said switching element.

3. The improvement of claim 2 wherein said actuating element is in the form of a generally cylindrical collar having bevelled leading and trailing surfaces.

4. The improvement of claim 1 further comprising checking means for permitting discharge of product from said pump chamber and checking return flow of product to said pump chamber, wherein said checking means comprises a valve seat disposed in said pump chamber outwardly of said piston, a valve member movable toward and away from said valve seat on the opposite side of said valve seat from said piston, and moving means for moving said valve member, in response to actuation of said control means by said actuating means, away from said valve seat upon advance movement of said piston from said rest position and toward said valve seat upon return movement of said piston.

5. The improvement of claim 4 wherein said actuating means comprises a switch having an externally actuatable switching element supported in spaced relation to said piston rod, an actuating element slidable along said piston rod, and means for securing said actuating element to said piston rod at a predetermined position to permit actuating of said switching element upon movement of said actuating element across said switching element.

6. The improvement of claim 5 wherein said actuating element is in the form of a generally cylindrical collar having bevelled leading and trailing surfaces.

7. The improvement of claim 4 wherein said moving means may be adjusted to control the speed and timing of said valve member.

8. In vacuumizing apparatus of the type including a vacuum chamber adapted to remove air from a meat emulsion or like food product, a pump adapted to pump product from the vacuum chamber, and control means for controlling the operation of said pump, the improvement wherein said pump comprises a housing, which defines a generally cylindrical pump chamber opening into a lower portion of said vacuum chamber, a piston, which is reciprocable within said pump chamber, a piston rod, which is connected between the piston and a prime mover to reciprocate said piston thus to pump product from the lower portion of said vacuum chamber outwardly through said pump chamber, actuating means for actuating said control means, upon movement of said piston rod to a predetermined position, to cause said piston to assume a predetermined rest position, and checking means for permitting discharge of product from said pump chamber and checking return flow of product to said pump chamber, said checking means comprising a valve seat disposed in said pump chamber outwardly of said piston, a valve member movable toward and away from said valve seat on the opposite side of said valve seat from said piston, and moving means for moving said valve member, in response to actuation of said control means by said actuating means, away from said valve seat upon advance movement of said piston from said rest position and toward said valve seat upon return movement of said piston.

9. The improvement of claim 8 wherein said actuating means comprises a switch having an externally actuatable switching element supported in spaced relation to said piston rod, an actuating element slidable along said piston rod, and means for securing said actuating element to said piston rod at a predetermined position to permit actuation of said switching element upon movement of said actuating element across said switching element.

10. The improvement of claim 9 wherein said actuating element is in the form of a generally cylindrical collar having bevelled leading and trailing surfaces.

UNITED STATES PATENT OFFICE
CERTIFICATE OF CORRECTION

Patent No. 3,599,556  Dated August 17, 1971

Inventor(s) Ditlev P. Madsen

It is certified that error appears in the above-identified patent and that said Letters Patent are hereby corrected as shown below:

Column 2, line 17, "section" should read -- sectional --; line 55, "reciprocable" should read -- reciprocatable --. Column 5, line 4, "reciprocable" should read -- reciprocatable --. Column 6, line 13, "reciprocable" should read -- reciprocatable --.

Signed and sealed this 21st day of March 1972.

(SEAL)
Attest:

EDWARD M. FLETCHER, JR.         ROBERT GOTTSCHALK
Attesting Officer               Commissioner of Patents